3,265,742
ALKYLATED PHENOLS
Ronald B. Spacht, Kent, Ohio, assignor to The Goodyear Tire & Rubber Company, Akron, Ohio, a corporation of Ohio
No Drawing. Original application Sept. 30, 1957, Ser. No. 686,833, now Patent No. 3,035,015, dated May 15, 1962. Divided and this application May 29, 1961, Ser. No. 113,069
2 Claims. (Cl. 260—619)

This application is a division of application Serial No. 686,833, filed September 30, 1957, now U.S. Patent No. 3,035,015.

This invention relates to the preservation of oxidizable compositions such as rubbers, gasolines, oils, etc.; and, more particularly, to the provision and use of a new class of alkylated high-boiling phenols which are useful as age resistors for the various oxidizable compositions.

Unsaturated materials such as rubbers and gasolines are subject to deterioration from many sources, such as sunlight, ozone, atmospheric oxygen, the presence of heavy metals, etc. Both cured and uncured natural and synthetic elastomers are subject to such deterioration. Deterioration in cured stocks of rubber may vary with the type of stock, the state of cure and the amount of surface exposed. Also, the temperature of the oxidizable compositions is an important factor in deterioration. An ideal antioxidant would be one which would protect the oxidizable compound from deterioration regardless of time, physical state of the oxidizable compound, and regardless of use. Since no such general antioxidant has been discovered, compromises must be made in the selection of an antioxidant for a particular use.

It is an object of this invention to provide non-discoloring antioxidants for oxidizable compositions such as rubbers, gasolines, oils, etc. It is another object of this invention to provide particular alkylated high-boiling phenols which are capable of protecting oxidizable compositions from deterioration due to oxygen, ozone, and/or sunlight, etc. It is still another object of this invention to provide a process for preparing particular alkylated high-boiling phenols which are capable of protecting various oxidizable compositions from deterioration due to oxygen, ozone, and/or sunlight, etc.

In the practice of this invention, alkylated high-boiling phenols may be made by reacting a mixture of particular phenols with one or more alkylating olefins. These alkylated compositions may be described as the reaction products of a mixture of high-boiling phenols which boil at a temperature between 230° C. and 270° C. and an olefin selected from the group consisting of alkenes, cycloalkenes and arylalkenes.

The compositions of this invention may be described as mixtures of alkylated phenols conforming to the following structure:

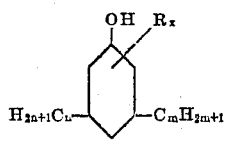

wherein R is a hydrocarbon radical containing from 3 to 12 carbon atoms, $x$ is an integer ranging from 1 to 3, $m$ and $n$ are integers ranging from 1 to 4 and the sum of $m$ and $n$ is an integer ranging from 3 to 5.

More particularly, the compositions of this invention can be described as the reaction products of a mixture of phenols which boil at a temperature between 230° C. and 270° C. conforming to the following formula:

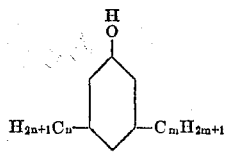

wherein $m$ and $n$ are integers ranging from 1 to 4 and wherein the sum of $m$ and $n$ is an integer ranging from 3 to 5 and an olefin selected from the group consisting of alkenes having from 3 to 12 carbon atoms, cycloalkenes having from 6 to 9 carbon atoms and arylalkenes having from 8 to 12 carbon atoms.

High-boiling phenols of this invention may be described as a mixture of alkyl substituted phenols having a boiling range of 230° C. to 270° C. The principal constituents of those high-boiling phenols are compounds with two alkyl chains comprised of three or more carbon atoms, the alkyl chains usually being attached to the phenolic nucleus in the positions meta to the hydroxyl radical. These high-boiling phenols are transparent liquids which have a total phenolic content in excess of 97% by weight, have a hydrocarbon impurity content of less than 3% and a water content less than 1% by weight. These high-boiling phenols contain no phenol or cresols, and contain only a negligible amount of xylenols. The high-boiling phenols of this invention are further described in Advanced Technical Information Bulletins Nos. F–8103B, F–8103, published by the Carbide and Carbon Chemicals Co. These compounds are particularly desirable as phenolic reactants because they display a high degree of trifunctionality wherein the ortho and para positions are available for substitution by means of olefins.

The high-boiling phenols of this invention contain approximately 15% by weight of indanol-4, 15% by weight of indanol-5, 10% by weight of 3-methyl-5-ethyl phenol and about 60% by weight of other meta-substituted phenols.

The olefins which are useful as alkylating agents for the high-boiling phenols of this invention are selected from the alkenes, the cycloalkenes, and the arylalkenes.

The alkenes which are useful in the practice of this invention are alkenes which customarily contain from 3 to 12 carbon atoms such as propylene, isobutylene, tertiary pentenes, tertiary hexenes, tertiary heptenes, tertiary octenes, tertiary nonenes and tertiary decenes. The cycloalkenes which are useful in the practice of this invention are cycloalkenes which may contain from 6 to 9 carbon atoms such as methyl cyclohexenes, cyclohexenes, cyclooctenes, cyclononenes, etc. The arylalkenes which are useful in the practice of this invention are the arylalkenes which may contain from 8 to 12 carbon atoms such as styrene, vinyl toluene, 1-methyl styrene, divinyl benzene, vinyl ethyl benzene, vinyl propyl benzene, vinyl isopropyl benzene, vinyl butyl benzene, etc.

The proportion of olefin to high-boiling phenols will vary according to the degree of alkylation desired and the available ortho and para positions. Customarily, the proportion of alkylating agent will be from 1 to 3 molecular equivalents of alkylating agent per molecular equivalent of high-boiling phenol. When complete alkylation of the phenolic rings is desired, an excess of alkylating agent may be used.

In the preparation of the alkylated high-boiling phenols, one or more of the customary acidic alkylation catalysts is used to activate and accelerate the reactions. For example, sulfuric acid, benzene sulfonic acid, toluene sulfonic acid, activated clays, stannic chloride, ferrous chloride, boron trifluoride, zinc chloride, the ferrous and ferric halides, the stannous and stannic halides, aluminum halide and aluminum oxide will activate the reactions. Usually, concentrated sulfuric acid is used as the alkylation catalyst. The catalyst will ordinarily be used in an amount of at least 0.5% of the total weight of reactants in order to obtain proper action. Larger amounts of the catalyst, for example, up to 5.0% by weight of the reactants, is satisfactory.

The temperature maintained during the alkylation process will normally be at least 50° C. but not over 150° C. If the alkylation temperature goes too high, the catalyst may become a catalyst for dealkylation. Although the temperature is not critical, the customary alkylation temperature of about 100° C. or less is normally used.

The practice of this invention is further illustrated by the following examples which are not intended as limitations on the scope of the invention.

*Example 1*

Three hundred grams of a mixture of phenols which boil between 230° C. and 270° C. were mixed with 4.0 grams of sulfuric acid and heated to a temperature of 130° C. The mixture was comprised of about 15% by weight of indanol-4, 15% by weight of indanol-5, 10% by weight of 3-methyl-5-ethyl phenol and about 60% by weight of meta substituted phenols selected from diethyl phenol, methyl propyl phenol, methyl butyl phenol and ethyl propyl phenol. Thereafter, 416 grams of styrene were added while the temperature was maintained between 130° C. and 135° C. Heating was continued for about 2 hours after which the catalyst was destroyed by means of sodium carbonate to provide a quantitative yield of di alpha phenyl ethyl high-boiling phenols determined by weighing the reaction products after heating to 200° C. at 20 mm. pressure to remove unreacted materials.

*Example 2*

Three hundred grams of a mixture of high-boiling phenols boiling at a temperature between 230° C and 270° C. (as described in Example 1) were mixed with 8 grams of sulfuric acid after which the mixture was heated to a temperature of 100° C. Thereafter, 105 grams of isobutene were added during a period of two hours. After this, 208 grams of styrene were added during a period of two hours, while the temperature was maintained between 130 and 140° C. after which the mixture was heated and stirred for an additional two hours. Thereafter, the catalyst was destroyed by means of sodium carbonate. This gave a yield of 95.7% of reaction products.

The products of this invention were tested in the following standard rubber formulation:

| | |
|---|---|
| Extracted pale crepe | 100 |
| ZnO | 5 |
| Sulfur | 3 |
| Hexamethylenetetramine | 1 |
| Stearic acid | 1.5 |
| Antioxidant | 1 |

Antioxidant efficiency was measured by aging samples cured at 285° C. for 50 minutes for 18 days in a standard oxygen bomb at 50° C. and 150 pounds per square inch pressure. The percent tensile retention and weight increase were used as measures of efficiency.

TABLE 1
[Oxygen bomb—18 days' aging]

| Description | Tensile Retention | | Percent Tensile Retention | Percent Weight Increase |
|---|---|---|---|---|
| | Original Tensile | Final Tensile | | |
| R.P. High Boiling Phenols,[1] Isobutene and Styrene 1:1:1 | 2,000 | 1,800 | 90.0 | 0.015 |
| R.P. High Boiling Phenols and Styrene 1:2 | 2,050 | 1,500 | 73.2 | 0.44 |
| Antioxidant A [2] | 2,250 | 1,150 | 51.1 | 0.90 |

[1] Described in Example 1.
[2] A commercial mixture of alkylated phenols.

The rubbers which can be protected by the products of this invention are oxidizable, rubbery polymers of conjugated dienes which include natural rubber and the various synthetic diene rubbers which are similar to natural rubber in their aging characteristics, such as polychloroprene; butyl rubber, which is a polymerization product of a major proportion of a mono-olefin, such as isobutylene, and a minor proportion of a multi-olefin, such as butadiene or isoprene; the rubbery copolymers of butadiene and styrene which may contain from 50 to 75% by weight of butadiene; the rubbery copolymers of butadiene and acrylonitrile; and polyisoprene.

The products of the invention are useful as age resistors for raw rubber in latex form, coagulated rubber latices or vulcanized rubber and may be present in an amount of from .25 to 5% by weight, based on the weight of rubber, although it is generally preferred to use from 0.5 to 2% by weight, based on the weight of the rubber.

The antioxidants of this invention can be incorporated into rubber in any customary manner. They may be added in the form of physical mixtures or in the form of emulsions, using any of the known emulsifiers such as monovalent metal hydroxides, fatty acids, organic soaps, etc. They may be added to the rubber in the form of latex, or they may be milled into coagulated rubber in the usual manner.

The compounds of this invention can also be used to stabilize thermally and catalytically cracked gasolines and gasoline blends by adding .0001% to 0.1% by weight of the antioxidant to the gasoline.

While certain representative embodiments and details have been shown for the purpose of illustrating the invention, it will be apparent to those skilled in this art that various changes and modifications may be made therein without departing from the spirit or scope of the invention.

I claim:

1. The butylated, styrenated 3,5-dialkyl phenol reaction products prepared by alkylating a mixture of phenols which boil at a temperature between 230° C and 270° C. conforming to the following structure:

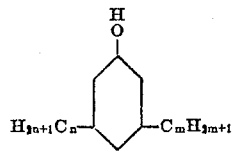

wherein $m$ and $n$ are integers ranging from 1 to 4 and wherein the sum of $m$ and $n$ is an integer ranging from 3 to 5 with isobutene and subsequently styrene, said reaction product being prepared in the presence of an acidic alkylation catalyst selected from the group consisting of sulfuric acid, benzene sulfonic acid, toluene sulfonic acid, activated clays, stannic chloride, ferrous chloride, boron trifluoride, zinc chloride, ferrous halides, ferric halides, stannous halides, stannic halides, aluminum halide and aluminum oxide at a temperature between 50° and 150° C.

2. The butylated, styrenated 3,5-dialkyl phenol reaction products prepared by reacting (a) one molecular equivalent of a mixture of phenols which boil at a temperature between 230° C. and 270° C. conforming to the following structure.

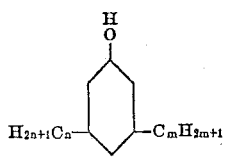

wherein $m$ and $n$ are integers ranging from 1 to 4 and wherein the sum of $m$ and $n$ is an integer ranging from 3 to 5 (b) one molecular equivalent of isobutene and subsequently (c) one molecular equivalent of styrene, said reaction product being prepared in the presence of an acidic alkylation catalyst selected from the group consisting of sulfuric acid, benzene sulfonic acid, toluene sulfonic acid, activated clays, stannic chloride, ferrous chloride, boron trifluoride, zinc chloride, ferrous halides, ferric halides, stannous halides, stannic halides, aluminum halide and aluminum oxide at a temperature between 50° and 150° C.

References Cited by the Examiner

UNITED STATES PATENTS

| | | | |
|---|---|---|---|
| 2,276,117 | 3/1942 | Taylor et al. | 260—619 |
| 2,285,626 | 6/1942 | Taylor et al. | 260—619 |
| 2,330,722 | 9/1943 | Lieber | 260—619 X |
| 2,396,050 | 3/1946 | Kellog et al. | 260—619 X |
| 2,472,463 | 6/1949 | Brandon et al. | 260—619 X |
| 2,655,546 | 10/1953 | Stevens et al. | 260—624 X |
| 2,969,343 | 1/1961 | Morris. | |

LEON ZITVER, *Primary Examiner.*

CHARLES B. PARKER, *Examiner.*

H. G. MOORE, D. M. HELFER, *Assistant Examiners.*